Oct. 1, 1957 B. H. GEYER ET AL 2,808,204

BINARY DIGITAL COMPUTING APPARATUS

Original Filed Oct. 3, 1951 2 Sheets-Sheet 1

Inventors
Bernard H. Geyer
Charles R. Wayne
by Merton D. Morse
Their Attorney.

BINARY DIGITAL COMPUTING APPARATUS

Inventors:
Bernard H. Geyer,
Charles R. Wayne,
by Merton D. Moore
Their Attorney.

United States Patent Office 2,808,204

Patented Oct. 1, 1957

2,808,204

BINARY DIGITAL COMPUTING APPARATUS

Bernard H. Geyer, North Syracuse, and Charles R. Wayne, Syracuse, N. Y., assignors to General Electric Company, a corporation of New York Continuation of abandoned application Serial No. 249,544, October 3, 1951. This application May 8, 1956, Serial No. 583,530

15 Claims. (Cl. 235—61)

Figure 1:
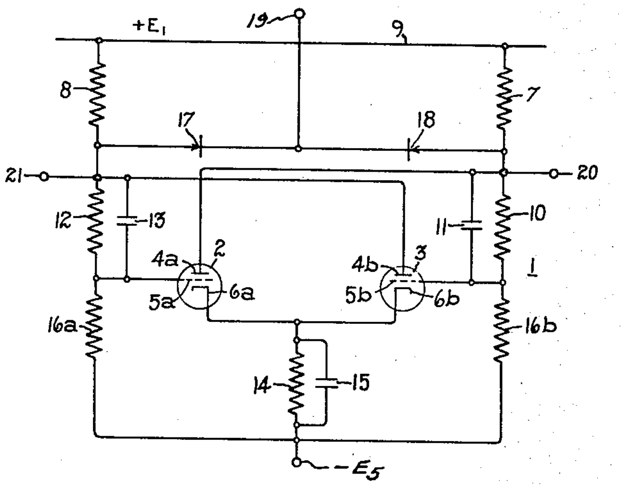

Our invention relates to binary digital computing apparatus and more particularly to means by which binary addition, with the necessary carrying of numbers from one digit place to the next, is accomplished. While our invention finds straightforward application in the addition process of binary numbers, it is also advantageously employed in the subtracting and multiplying processes of binary numbers which utilize steps of addition in their fulfillment.

This application is a continuation of our copending application Serial No. 249,544, now abandoned, filed October 3, 1951, and assigned to the assignee of this application.

In the basic binary number system, of which there are many variations or "codes" to which the following reasoning applies, any decimel number may be expressed in terms of series of binary digits each having one of two values or designations such as 1 and 0, true and false, good and bad, etc. This is done in the straight binary system by assigning to succeeding digit places in a binary expression decimal numerical values corresponding to the number 2 raised to succeeding powers and then indicating the presence or absence of a particular decimal value in the total decimal number by one or the other of the chosen two binary numbers or designations in the corresponding digit place. For example, the following table shows the binary expressions for the decimal numbers 1 through 11, the decimal values assigned to each binary digit place being shown as 2 raised to a certain power and its presence or absence in the binary expression being indicated by the binary numbers 1 and 0 respectively:

| Binary System | | | | Decimal System |
|---|---|---|---|---|
| $2^3$ | $2^2$ | $2^1$ | $2^0$ | |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| etc. | | | | |

In the mathematical operation of decimal system addition, it is often necessary to carry a number from one column to the next in order to arrive at a true sum. In addition of binary expressions, the same necessity is sometimes present for carrying a predetermined one of the binary number designations from one digit place to the next in order to arrive at a true binary sum. Consider the binary addition of the two decimal numbers 7 and 2 as shown below:

| | | |
|---|---|---|
| Carry | 1 1 | |
| Addend | 0 1 1 1 | =7 |
| Augend | 0 0 1 0 | =2 |
| Sum | 1 0 0 1 | =9 |

It is seen in this binary addition that the 1 and 0 in the first digit place on the right add to produce a 1 in the sum with no carry. The 1 and the 1 in the second digit place add to produce a 0 in the sum with a carry of 1 to the third digit place. Adding the 1 and the 0 in the third digit place yields a 1 to which the carry of 1 is added to produce a 0 in the sum and a carry of 1 to the fourth digit place. Generally speaking, then, it may be said that a binary carry of 1 must take place from a given digit place to the succeeding digit place when at least two of three values—the binary numbers in the given digit place of an addend and an augend expression and the carry from the preceding digit place—are binary 1's.

In binary digital computing devices the two possible binary numbers, 1 and 0, in a given digit place of a binary expression are conveniently represented by two possible predetermined potentials at two oppositely designated output terminals of a storage unit, i. e., a triggered multivibrator such as an Eccles-Jordan flip-flop circuit. Such a storage unit of flip-flop circuit includes two electric discharge devices interconnected so as to have two stable states of conduction, one device being cut off from current flow therethrough when the other device is conducting saturation current. The flip-flop circuit may be switched from one stable state of conduction to the other by the application of a triggering voltage pulse over a common triggering input terminal. The two output terminals of the flip-flop circuit complementally reside at two predetermined potential levels, say $V_1$ and $V_2$, during either conduction state of the flip-flop circuit. During one of the two stable conduction states, when the first output terminal is at the $V_1$ potential and the second output terminal is at the $V_2$ potential, the flip-flop circuit is said to "store" a predetermined one of the two binary numbers and during the other stable conduction state when the first output terminal is at the $V_2$ potential and the second output terminal is at the $V_1$ potential, the flip-flop circuit is said to store the other of the two binary numbers. Thus, the binary numbers may be expressed equivalently by the conduction state of the flip-flop circuit or by the potentials at the oppositely designated output terminals, a potential of $V_1$ or $V_2$ at a first output terminal or a potential of $V_2$ or $V_1$ at a second output terminal representing the binary numbers 1 or 0 respectively.

To represent any complete binary expression, then, it is only necessary to assemble a series or register of storage units, one for each digit place in the expression, and to cause each storage unit to be in the proper conduction state. Our invention is particularly concerned with the addition of an addend binary expression represented by the conduction states of a first such register and an augend binary expression represented by the conduction states of a second such register whereby the conduction states of one register are changed to represent the sum of the two original binary expressions in response to actuating signals.

It is an object of our invention to provide a new and improved means for effecting binary addition in binary digital computing devices, such means being embodied in a carry-adder unit.

It is another object of our invention to provide a carry-adder unit in combination with storage units to form a new and improved binary addition system.

It is another object of our invention to provide a carry-adder unit which effects the carrying of binary numbers in response to pulse actuation.

It is still another object of our invention to provide a carry-adder unit which is highly efficient and requires little operating power.

And it is still another object of our invention to provide a carry-adder unit which may employ low current rated electric discharge devices and inexpensive components by virtue of the fact that conduction thereby is intermittent and pulse-like in nature.

Briefly stated, the carry-adder unit of our invention in one form thereof comprises a plurality of transfer units or potential sensing and selective pulse transmission networks to be interconnected between addend and augend storage units representing binary digits by their conduction states and output potentials. The transfer units receive a first of two sequential input voltage pulses essentially simultaneously with any carry input pulse from the preceding digit place, resulting from the first input pulse, and a second of the two sequential input voltage pulses shortly thereafter. In response to the two sequenced input voltage pulses, to any carry input pulse from the preceding digit place, and to the potentials sensed from the storage units, the transfer units cause the augent storage units to be triggered to, or left in, the conduction state representing the proper binary sum number and to transmit a carry output pulse to the succeeding digit place only if a carry is to be made according to the principles of binary addition.

The transfer units, which are multi-terminal potential sensing and selective pulse transmission networks, shown and to be described in connection with a preferred embodiment of the carry-adder unit are described and claimed per se in the copending application of B. R. Lester, Serial No. 233,803, filed June 27, 1951, now U. S. Patent 2,781,447, and assigned to the assignee of the present application. We, therefore, do not herein claim anything shown or described in the Lester application which is to be regarded as prior art with respect to this present application.

Since a carry of a binary 1 may propagate through several digit places, i. e., several carry adder units, a pulse amplifier having a very short time delay of response may be provided with each carry-adder unit to compensate for attenuation of the carry voltage pulse by the transfer units.

The carry-adder unit of our invention requires no discrete D. C. potential levels to indicate the presence or absence of a carry to be made, since the carries take place in the form of pulses resulting directly from the actuation pulses and selectively transmitted by the carry adder unit. The addition process is, therefore, very fast; and since the carry indication is in the form of voltage pulses, the power consumed by the carry-adder unit is small, and low current rated electric discharge devices may be used.

Figure 2:
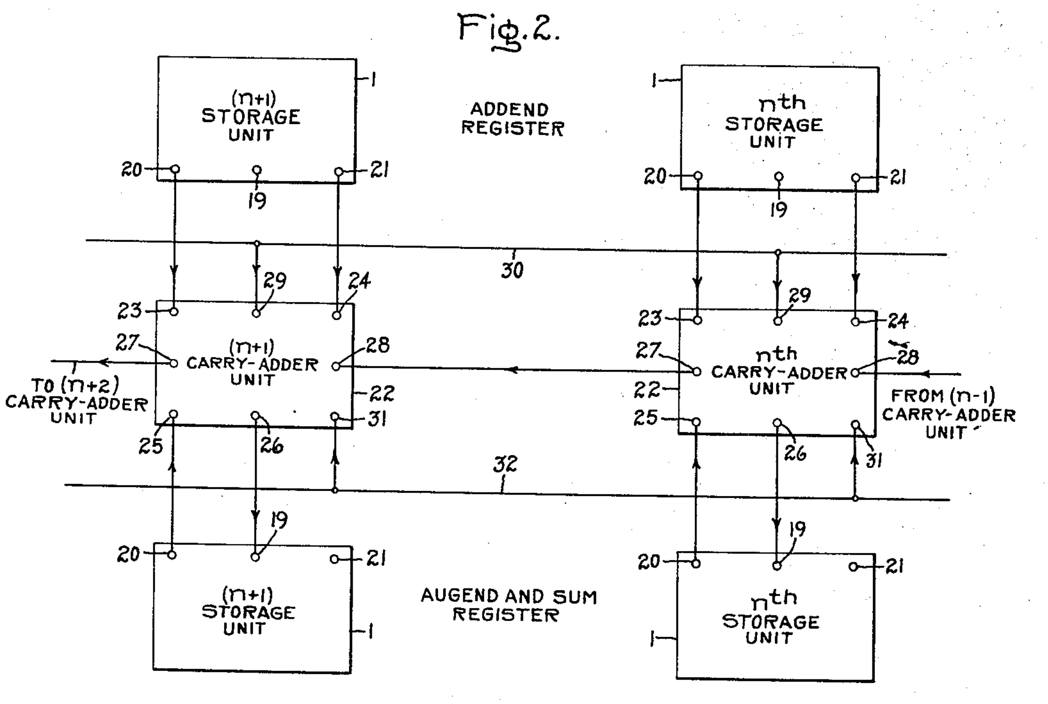
Figure 3:
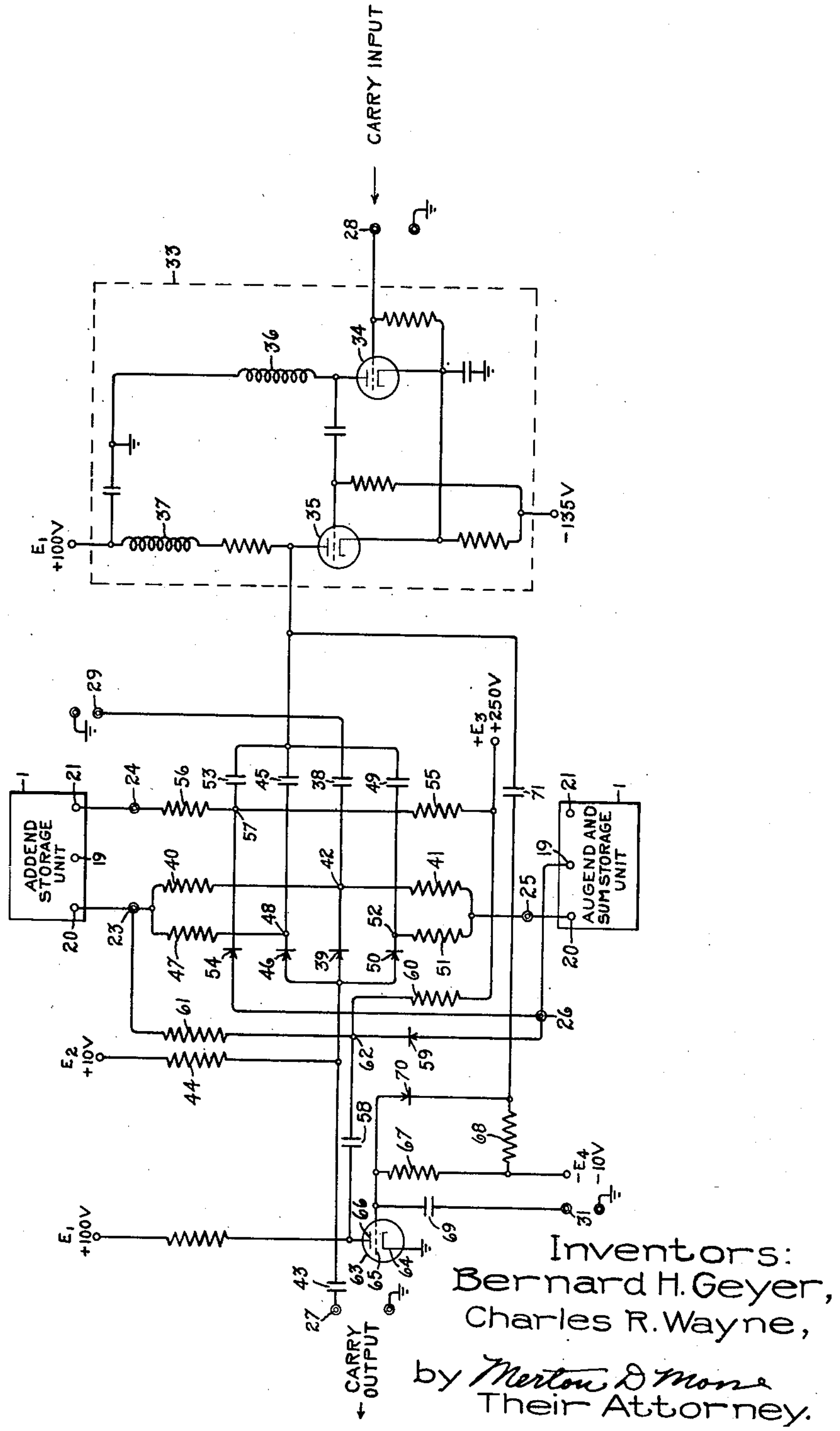

The novel features of our invention are pointed out with particularity in the appended claims. However, for a better understanding of the invention, both as to its organization and operation, and for further objects and advantages thereof, reference should be had to the following description taken in conjunction with the accompanying drawings, wherein:

Fig. 1 is a schematic circuit diagrame of a typical binary storage unit, i. e., triggered multivibrator, which is shown by a block diagram in the remaining figures; Fig. 2 is a block and line representation of a binary addition system formed by a plurality of storage units and a plurality of pulsed carry-adder units of our invention; and Fig. 3 is a schematic circuit diagram of a preferred embodiment of the carry-adder unit of our invention, associated with two storage units represented in block form.

Referring now to the drawings, we have shown in Fig. 1 the schematic circuit diagram of an exemplary triggered multivibrator or storage unit 1 which includes two electric discharge devices 2 and 3 having anodes 4a and 4b, cathodes 6a and 6b, and control electrodes 5a and 5b respectively. Anodes 4a and 4b are connected through load resistors 7 and 8 respectively to a source of positive operating potential, $E_1$, suitably represented by a supply conductor 9. Anode 4a is connected to control electrode 5b through a paralleled resistor 10 and capacitor 11 while anode 4b is connected to control electrode 5a through a paralleled resistor 12 and capacitor 13. Cathodes 6a and 6b are connected to a source of negative operating potential, $-E_5$, through a common cathode resistor 14 which is paralleled by a capacitor 15; and the control electrode circuits are completed by two resistors 16a and 16b connecting control electrodes 5a and 5b, respectively, to $-E_5$. Two preferably identical diode rectifiers 17 and 18 are connected in series opposition between anodes 4a and 4b and provide at the junction therebetween a common triggering input terminal 19. Output terminals 20 and 21 are connected to anodes 4a and 4b respectively.

Storage unit 1 operates in a well-known manner for triggered multivibrator or Eccles-Jordan flip-flop circuits, having two stable states of conduction. Either anode 4a or anode 4b conducts saturation current at any one time, except for extremely short switching periods, but both anodes cannot conduct simultaneously. Whichever anode is conducting at any one time resides at a relatively low potential $V_1$ with respect to $E_1$ due to a large voltage drop across its load resistor 7 or 8, while the non-conducting anode resides at a relatively high potential $V_2$, approximately equal to $E_1$. This condition prevails until a negative voltage pulse is applied between input terminal 19 and ground and which is selectively routed by rectifiers 17 and 18 to appear at the control electrode of the conducting anode to cut off its conduction, whereupon the two anodes rapidly switch conduction and potentials. Thus each succeeding input triggering voltage pulse switches storage unit 1 from one stable conduction state to the other and establishes output potentials $V_1$ and $V_2$ alternately at output terminals 20 and 21. The output terminals 20 and 21 thus complementally reside at the potentials $V_1$ and $V_2$, one of the output terminals always being at $V_1$ potential while the other is at $V_2$ potential. For purposes of reference in the following description, certain points have been indicated as being connected to ground which is assumed to remain at zero reference potential and with respect to which all potential levels and voltages mentioned are to be considered, unless specifically denoted otherwise. During either stable conduction state of storage unit 1, input terminal 19 resides at a potential of $V_2$ since rectifiers 17 and 18 are poled to conduct current in a conventional sense only toward their junction, terminal 19.

With regard to binary number storage or representation by storage unit 1, a predetermined one of two possible binary designations or numbers is stored or represented by a predetermined one of the two possible stable conduction states. Also, with opposite designations for output terminals 20 and 21, a predetermined one of the potentials $V_1$ and $V_2$ at one of these output terminals may indicate a predetermined one of the two possible binary members. For example, it may be said that storage unit 1 stores a binary 1 whenever it is in the stable conduction state with device 2 conducting saturation current, i. e., whenever output terminal 20 is at the relatively low potential $V_1$ and output terminal 21 is at the relatively high potential $V_2$.

For clarity of illustration in the following description and in no sense by way of limitation, let it be assumed that the operating supply potential $E_1$ is +100 volts, that the $V_1$ potential is +10 volts, and that the $V_2$ potential is +90 volts, all with respect to ground potential. The binary number stored by a storage unit 1 for purposes of illustration in this specification is thus arbitrarily defined by the potential of oppositely designated output terminals as shown below:

| Potential of Terminal 20 | Potential of Terminal 21 | Binary No. Stored |
|---|---|---|
| +10 volts | +90 volts | 1 |
| +90 volts | +10 volts | 0 |

Further, with this illustrative assumption, it will be seen that input terminal 19 is at approximately +90 volts potential during the storage of either binary number, i. e., during either conduction state of storage unit 1.

Turning next to Fig. 2, we have shown a binary addition system which is of the type generally classified as parallel adding systems wherein equal order digits of the addend and augend are summed at the same time. The addition system of our invention comprises a first plurality of storage units 1 constituting an addend register and a second plurality of storage units 1 constituting an augend and sum register. A plurality of carry-adder units 22 are interconnected one between each pair of equal order digit place storage units. By designating the storage units 1 and the associated carry-adder unit on the right as being the *n*th digit place we have indicated that the addition system of Fig. 2 may accommodate any number of digit places, one addend register storage unit 1, one augend and sum register storage unit 1, and one carry-adder unit 22 being provided for each digit place.

Now in each digit place of the addition system, the carry-adder unit 22 is connected to sense by sensing terminals 23, 24, and 25 the potentials at the output terminals 20 and 21 of the addend register storage unit 1 and the output terminal 20 of the augend register storage unit 1 respectively. Further, each carry-adder unit 22 is connected from a carry-adder output terminal 26 to the input terminal 19 of the augend register storage unit 1 to supply a triggering voltage pulse to that storage unit in the addition process when it is necessary to switch the augend register storage unit 1 to cause it to store the proper binary sum number; and is also connected from a carry output terminal 27 to a carry input terminal 28 on the succeeding digit place carry-adder unit 22. The directions of electrical intelligence transfer over the various connections have been indicated for clarity by arrows. The addition operation is initiated by two sequenced actuating voltage pulses—very short in duration and spaced in time from one another by a brief period in the order of one to five microseconds—the first being supplied between all carry-adder unit input terminals 29 and ground over a pulsing bus 30 and the second between all carry-adder unit input terminals 31 and ground over a second pulsing bus 32. In the preferred embodiment of carry-adder units 22 shown by Fig. 3 to be described presently, the first sequenced voltage pulse applied to terminals 29 is made negative in polarity and the second sequenced voltage pulse applied to terminals 31 is made positive in polarity with respect to ground and spaced in time from the first pulse by approximately two microseconds. Both sequenced actuation pulses are made approximately 30 volts in amplitude for the exemplary supply voltages and potentials given and have a duration somewhat in the order of one microsecond. The two sequenced voltage pulses and, therefore, separate addition operations may be repeated approximately every 10 microseconds. The connections between pulsing buses 30 and 32 and carry-adder units 22, between carry-adder output terminals 26 and augend storage unit input terminals 19, and between successive carry-adder units 22 are marked with arrows indicating the direction of intelligence travel, the actuation pulses being selectively transmitted by carry-adder unit 22 so that all the augend storage units 1 are properly triggered, only if necessary, to cause them to represent the binary sum expression of the two binary expressions originally represented by the addend and augend registers.

We have formulated certain rules for the general binary addition process which our pulsed carry-adder unit 22 follows in response to the two sequenced voltage pulses supplied thereto through input terminals 29 and 31 to take into account the necessity for carries and the triggering of the augend and sum storage unit 1 only if it is necessary to trigger it to cause it to store the proper binary sum number. There is no double-triggering of storage units 1 and the addition operation, actuated by two short and closely sequenced voltage pulses, is, therefore, a fast one. Considering a given digit place, these rules may be stated as follows:

*Pulsed carry-adder binary addition rules*

Rule (1) If and only if addend number is different than the carry number from the preceding digit place, change the augend number.

(1*a*) If the addend number is 0 and there is a carry of 1 from the preceding digit place, change the number in the augend to get the sum number.

(1*b*) If the addend number is 1 and there is a carry of 0 (i. e., no carry) from the preceding digit place, change the number in the augend to get the sum number.

(1*c*) If the addend number is 1 and there is a carry of 1 from the preceding digit place, do not change the number in the augend to get the sum number.

(1*d*) If the addend number is 0 and there is a carry of 0 from the preceding digit place, do not change the number in the augend to get the sum number.

Rule (2) If either of the addend or augend numbers is 1 and there is a carry of 1 from the preceding digit place, supply a carry of 1 to the succeeding digit place.

Rule (3) If both the addend number and the augend number are 1, supply a carry of 1 to the succeeding digit place.

(2*a*—3*a*) If the addend number, the augend number and the number carried from the preceding digit place are all 1's, supply only one carry output pulse to the succeeding digit place, i. e., do not exercise both rules (2) and (3).

Consider, for example, the validity of the foregoing rules with respect to the binary addition shown below

| Digit Place | 6th | 5th | 4th | 3rd | 2nd | 1st | |
|---|---|---|---|---|---|---|---|
| Carry | 0 | 1 | 1 | 1 | 1 | | |
| Addend | 0 | 0 | 1 | 1 | 0 | 1 | =13 |
| Augend | 0 | 0 | 1 | 0 | 1 | 1 | =11 |
| Sum | 0 | 1 | 1 | 0 | 0 | 0 | =24 |

The addition in the first digit place above illustrates the application of rules (1*b*) and (3); the second digit place illustrates the application of rules (1*a*) and (2); the third digit place illustrates the application of rules (1*c*) and (2); the fourth digit place illustrates the application of rules (1*c*), (3), and (2*a*—3*a*); the fifth digit place illustrates the application of rule 1*a*; and the sixth digit place illustrates the application of rule (1*d*). In the addition system of our invention a carry of 1 is supplied from one digit place to the next as a carry voltage pulse while a carry of 0, or no carry, is indicated by the absence of a voltage pulse. Similarly, a necessary change in the augend is effected by supplying a voltage pulse to the augend storage unit 1 to trigger it and no change in the augend is effected by the absence of the triggering voltage pulse. These carry and triggering voltage pulses are, in response to the sequenced actuating voltage pulses, properly transmitted by carry-adder units 22 so that the augend register is made to represent the sum of the original addend and augend expressions, as will become apparent during the following description referring to Fig. 3.

Referring next to the schematic diagram of a preferred embodiment of carry-adder unit 22 shown by Fig. 3 in order that the organization and operation of the carry-adder unit 22, as well as the operation of the binary addition system of Fig. 2, may be better understood, the sensing terminals 23, 24, and 25 may be identified as being connected to output terminals 20 and 21 of the addend storage unit 1 and to the output terminal 20 of the augend storage unit 1 respectively; carry-adder output terminal 26 may be identified as being connected to the triggering input terminal 19 of the augend and sum storage unit 1; carry pulse output and input terminals 27 and 28 respectively may be identified; and carry-adder input terminals 29 and 31 provided to receive sequenced actuation voltage pulses may be identified.

An amplifier 33 is provided to amplify carry-input voltage pulses applied to carry-input terminal 28, amplifier 33 preferably being a two-stage pulse amplifier having minimum time delay of response in order that carry input pulses are received and amplified essentially simultaneously with the first sequenced actuation voltage pulse applied to carry-adder input terminal 29 to accomplish the dictates of rule (2*a*—3*a*), as will be explained hereinafter. A preferred form for amplifier 33 is shown as comprising two amplifying discharge devices 34 and 35 connected in cascade relation and having peaking inductances 36 and 37 included in the anode circuits thereof to compensate for stray anode-to-ground capacitive loading and to afford fast rise or fall times of anode potential. A negative carry input voltage pulse applied to terminal 28 is thus amplified and appears with very little time delay as a negative potential change at the anode of discharge device 35.

In carry-adder unit 22, there is means for providing a carry output voltage pulse to terminal 27 in response to a first input voltage pulse applied to input terminal 29 only when the associated addend and augend storage units both represent a binary one, such means in a preferred form comprising a first transfer unit including a capacitor 38, a rectifier 39, and two preferably equal-valued sensing resistors 40 and 41 connected in star relation to a common junction point 42 and to carry-adder input terminal 29, to carry output terminal 27 through a D. C. blocking capacitor 43, to sensing terminal 23, and to sensing terminal 25 respectively as shown. Rectifier 39 is poled to have low impedance to current flow in the conventional sense toward junction point 42 and is also connected to a referencing supply potential $E_2$, which for the exemplary potentials chosen for storage units 1 may be +10 volts, through a resistor 44. A first negative input pulse applied at terminal 29 is thus transmitted by rectifier 39 only when junction 42 is at approximately +10 volts or less in potential, that is, only when the potential at output terminals 20 of both the addend and augend storage units 1 are at +10 volts potential indicating a binary 1 in both the addend and augend. Thus, this first transfer unit fulfills the requirement of the aforestated rule (3).

It is seen from the foregoing that a carry output pulse may be initiated in one carry-adder unit in response to the first sequenced input voltage pulse and supplied to the next succeeding carry-adder unit as an input carry voltage pulse. The carry-adder unit 22 includes means for providing a carry output voltage pulse in response to any carry input voltage pulse only when the addend storage unit 1 represents a binary 1, such means comprising in a preferred form a second transfer unit including a capacitor 45, a rectifier 46, and a sensing resistor 47 all connected to a common junction point 48 and to the carry input terminal 28 through amplifier 33, to carry output terminal 27 through blocking capacitor 43, and to sensing terminal 23 respectively as shown. Rectifier 46 is poled to have low impedance to current flow in the conventional sense toward junction point 48 and is also connected to referencing potential $E_2$ through resistor 44. A negative carry input voltage pulse applied at carry input terminal 28 is thus transmitted to carry output terminal 27 as a negative carry output voltage pulse only when junction 48 is at approximately +10 volts or less in potential, that is only when the potential at output terminal 20 of the addend storage unit 1 is at +10 volts potential indicating a binary 1 in the addend. Means for providing a carry output voltage pulse in response to any carry input voltage pulse only when the augend storage unit 1 represents a binary 1 are preferably embodied in a third transfer unit which includes a capacitor 49, a rectifier 50, and a sensing resistor 51, all connected to a common junction point 52. This third transfer unit is connected and operates similarly to the second transfer unit, except that it is connected to the output terminal 20 of the augend and sum storage unit 1 and therefore transmits negative voltage pulses only when the augend storage unit represents a binary 1. Briefly stated, the second and third transfer units described above together constitute means for providing an output carry voltage pulse in response to any input carry voltage pulse when either the addend or the augend storage units represent a binary 1, in accordance with the aforestated rule (2).

The duration of the first sequenced actuation pulse applied to terminal 29 should be such that any carry input pulse from preceding digit places caused by the first sequenced pulse partially coincides in time with the first sequenced input voltage pulse. Thus, if both addend and augend storage units 1 hold a binary 1 and there is a carry input voltage pulse received from the preceding digit place as a result of the first sequenced input voltage pulse applied to all carry-adder input terminals 29, the first transfer unit transmits the first sequenced input voltage pulse and the second and third transfer units both transmit the carry input pulse. However, because there is very little time delay in amplifier 33 and in the transfer units, the two transmitted pulses coincide and appear, in effect, as a single carry output voltage pulse at carry output terminal 27. It has been found that a carry voltage pulse propagated through a great number of digit places and transmitted by the second and third transfer units coincides sufficiently with the first sequenced voltage pulse transmitted by the first transfer unit so that only one carry output voltage pulse results, by minimizing the delay of amplifier 33. This provides operation in accordance with the aforestated rule (2*a*—3*a*).

Each carry-adder unit 22 also includes means for triggering the augend storage unit 1 in response to any input carry voltage pulse, indicating a carry of 1 from the preceding digit place, only if the addend storage unit represents a binary 0, such means preferably comprising a fourth transfer unit including a capacitor 53, a rectifier 54, a sensing resistor 55, and a sensing resistor 56, all connected to a common junction point 57 and connected to carry input terminal 28 through amplifier 33, to carry-unit output terminal 26, to a source of reference potential indicated as $+E_3$ and to output terminal 21 of the addend storage unit 1 respectively as shown. Rectifier 54 is poled to have low impedance to current flow in the conventional sense toward junction point 57 and is conveniently afforded a reference potential to work into, in the illustrated circuit of Fig. 3, by virtue of the fact that input triggering terminal 19 always resides at a potential of approximately +90 volts. The values of resistors 55 and 56 and of potential $+E_3$ are so chosen that by voltage dividing action the potential of junction 57 is approximately +90 volts whenever terminal 21 of the addend storage unit is at +10 volts potential, i. e., whenever the addend storage unit represents a binary 0. At all other times the addend terminal 21 is at +90 volts and junction 57 is considerably more positive than +90 volts. Thus, a negative carry input voltage pulse applied at carry input terminal 28 is fully transmitted by rectifier 54 to trigger the augend storage unit 1 only when junction point 57 is at or below a +90 volt potential. This condition exists only when the addend storage unit 1 represents a binary 0, i. e., when its output terminal 21 is at a +10 volt potential, and therefore, the above stated rule (1*a*) is fulfilled. Also, rule (1*c*) is also partially fulfilled since a triggering voltage pulse is not transmitted to the augend storage unit 1 as a result of a carry input voltage pulse if the addend storage unit 1 represents a binary one, i. e., its output terminal 21 is at a +90 volt potential and junction 57 is considerably above +90 volts in potential.

Means for triggering the augend storage unit 1 in response to a second input voltage pulse only if the addend storage unit 1 represents a binary 1 are preferably embodied in a fifth transfer unit including a capacitor 58, a rectifier 59, a sensing resistor 60, and a sensing resistor 61, all connected to a common junction point 62. We prefer to connect capacitor 58 to carry-adder input terminal 31 through a pulse inverting discharge device 63 and to make the second sequenced voltage pulse supplied to terminal 31 positive in polarity for reasons to become apparent presently. Sensing resistor 61 and rectifier 59 are connected to sensing terminal 23 and carry-adder output terminal 26 respectively as shown, rectifier 59 being poled to conduct current in a conventional sense toward junction point 62 and conveniently provided in the illustrated circuit with a reference potential to work into by virtue of the fact that triggering input terminal 19 of the augend storage unit 1 is always at approximately +90 volts potential. Sensing resistor 60 is in turn connected to reference potential $+E_3$ and the values of resistors 60 and 61 are so chosen that by voltage dividing action the potential of junction 62 is approximately +90 volts whenever terminal 20 of the addend storage unit is at +10 volts potential, i. e., whenever the addend storage unit represents a binary 1. At all other times the addend terminal 20 is at +90 volts and junction 57 is considerably more positive than +90 volts. Rectifier 59 transmits voltage pulses only when junction 62 is at or below +90 volts potential. A positive second sequenced actuation voltage pulse applied to carry-adder input terminal 31 through device 63 is thus transmitted to the augend storage unit 1 by rectifier 59 as a negative triggering voltage pulse only if the addend storage unit 1 stores a binary 1, i. e., its output terminal 20 is at +10 volts potential, in a manner of operation similar to that given in connection with the fourth transfer unit. This fifth transfer unit, therefore, fulfills rule (*1b*).

Now we further have provided means to prevent the transmission of the second sequenced voltage pulse, and thus to prevent the triggering of the augend storage unit 1 in response to the second sequenced voltage pulse, if a carry input voltage pulse has preceded the second sequenced voltage pulse in the same addition operation, such means comprising discharge device 63 having a cathode 64, a control electrode 65, and an anode 66; and a pair of resistors 67 and 68, a capacitor 69, and a rectifier 70 connected to provide a time delay biasing circuit for discharge device 63. As shown in Fig. 3, capacitor 69 is connected between control electrode 65 and carry-adder input terminal 31 while resistor 67 is connected between control electrode 65 and a source of negative potential indicated by $-E_4$. The series combination of rectifier 70, poled to conduct current in a conventional sense away from control electrode 65, and resistor 68, is connected across resistor 67, and the junction between rectifier 70 and resistor 68 is connected through a D. C. blocking capacitor 71 and amplifier 33 to carry input terminal 28. Whenever a negative carry input voltage pulse is supplied to carry input terminal 28, capacitor 69 is quickly charged through rectifier 70 so that control electrode 65 is momentarily negatively biased considerably beyond the current cutoff point for device 63. Since such a negatively biasing charge on capacitor 69 is slowly discharged through resistor 67 the delay bias circuit serves as means to prevent the positive second sequenced input voltage pulse applied over terminal 31 from triggering the augend storage unit 1 when a carry input voltage pulse occurs at least as late in time as the first sequenced input voltage pulse and no later than the second sequenced voltage pulse; thus when this condition is satisfied, the second sequenced input voltage pulse is not transmitted and inverted by device 63 and hence does not trigger the augend storage unit 1 through the fifth transfer unit regardless of the potential of the addend storage unit output terminal 20. The positive second sequenced input voltage pulse is made of such magnitude and so timed that it occurs before the resistance-capacitance circuit 67—69 discharges sufficiently, if a carry input voltage pulse spaced in time between the first and second sequenced input voltage pulses has occurred, for its transmission through device 63. The values of resistor 67 and capacitor 69 and the resulting time constant thereof are so chosen that capacitor 69 is discharged before the next addition operation, i. e., before the next positive second sequenced voltage pulse occurs but that so capacitor 69 is only slightly discharged from the effect of any carry input voltage pulse at the time that the positive second sequenced voltage pulse occurs in the same addition operation. From this analysis, it will be seen that the biasing means embodied in device 63 and its associated control electrode circuit provides operational function in accordance with the aforestated rule (*1c*) by preventing the second sequenced voltage pulse from triggering the augend storage unit 1 when an input carry voltage pulse has occurred in any one addition operation.

From the foregoing description of the organization and operation of carry-adder unit 22 given in connection with Fig. 3, the operation of the addition system of Fig. 2, which may contain any number of digit place representations, will now be clearly understood. Each carry-adder unit 22, with its associated addend and augend storage units 1, receives the two sequenced actuating voltage pulses over pulsing buses 30 and 32 from an actuating pulse source, not shown, and in response to these sequenced input voltage pulses and any carry input voltage pulse from the preceding digit place, supplies a carry output pulse to the succeeding digit place and a triggering voltage pulse to its augend storage unit 1 only in accordance with the aforestated formulated rules for binary addition.

The carry-adder unit 22 of our invention is of simple and economical construction and since the circuits therein are required to handle relatively short duration pulse signals, it operates efficiently with little power dissipation and the electron discharge devices contained therein may be of low current rating. The carry-adder unit 22 in combination with storage units 1 provides a novel binary addition system which is extremely fast acting and in which the addition operation is completed solely in response to two sequenced voltage pulses.

It will be understood that the particular storage unit shown and described in connection with Fig. 1 is an exemplary storage unit and that other forms of storage units may be used in connection with the present invention. Various voltages and potential levels and polarities of voltage pulses other than those given by example for clarity in the foregoing description may also be used in the carry-adder unit and adding system of our invention. While the present invention has been described by reference to a particular embodiment thereof, it will be understood that numerous modifications may be made by those skilled in the art without actually departing from the spirit of the invention. We, therefore, aim in the appended claims to cover all such equivalent variations as come within the true spirit and scope of the foregoing disclosure.

What we claim as new and desire to secure by Letters Patent of the United States is:

1. A parallel binary digital addition system comprising in combination at least one addend and one augend storage unit each having two stable conduction states, and at least one carry-adder unit; said storage units each having two oppositely designated output terminals complementally residing at one of two predetermined potentials during each of said two stable conduction states and a triggering input terminal, said potentials each being representative of one of two binary numbers; said carry-adder unit being connected to sense the potentials of at least one output terminal of each of said storage units and to the triggering input terminal of said augend storage unit; said carry-added unit having input and output carry pulse terminals and first and second input voltage pulse terminals comprising passive impedance network means responsive to first and second sequenced input voltage pulses at said first and second voltage pulse terminals respectively and any input carry voltage pulse at said input carry pulse terminals the occurrence of which represents a carry input of a predetermined one of said two numbers and the absence of which represents a carry input of the other of said two numbers for triggering said augend storage unit only when the number represented by said addend storage unit and the carry input number supplied to said carry-adder unit are unlike, and means connected to said first input voltage pulse terminal and said input and output carry pulse terminals for providing an output carry voltage pulse from said carry-adder unit the occurrence of which represents a carry output of said predetermined one number and the absence of which represents a carry output of said other number only when at least two of the numbers represented by said storage units and the carry input number supplied to said carry-adder unit are said predetermined one number.

2. A parallel binary digital addition system comprising in combination at least one addend and one augend storage unit each having two stable conduction states, and at least one carry-adder unit; said storage units each having two oppositely designated output terminals complementally residing at one of two predetermined potentials during each of said two stable conduction states and a triggering input terminal, said potentials each being representative of one of two binary numbers; said carry-adder unit being connected to sense the potentials of at least one output terminal of each of said storage units and to the triggering input terminal of said augend storage unit; said carry-adder unit having a carry-voltage output terminal and comprising means responsive to a first of two sequenced input actuation voltage pulses supplied to said carry-adder unit for providing at said carry-voltage output terminal an output carry voltage pulse from said carry-adder unit only when both of said storage units represent a predetermined one of said two numbers, means responsive to a second of said two sequenced input actuation voltage pulses supplied to said carry-adder unit for triggering said augend storage unit only when said addend storage unit represents said predetermined one number, means responsive to an input carry voltage pulse supplied to said carry-adder unit for providing at said carry-voltage output terminal an output carry voltage pulse from said carry-adder unit only when either of said storage units represents said predetermined one of said two numbers and for triggering said augend storage unit only if said addend storage unit represents the other of said two numbers, and means for preventing said second-mentioned means from triggering said augend storage unit when an input carry voltage pulse is supplied to said carry-adder unit spaced in time between said two sequenced input actuation voltage pulses.

3. A parallel binary digital addition system comprising in combination at least one addend and one augend storage unit each having two stable conduction states, and at least one carry-adder unit; said storage units each having two oppositely designated output terminals complementally residing at one of two predetermined potentials during each of said two stable conduction states and a triggering terminal, said potentials each being representative of one of two binary numbers; said carry-adder unit having carry-voltage input and output terminals and means connecting said carry-adder unit to said storage units, said carry-adder unit further comprising means for providing at said carry-voltage output terminal an output carry voltage pulse in response to any input carry voltage pulse supplied to said carry-adder unit when either of said storage units represents a predetermined one of said two numbers, means for providing at said carry-voltage output terminal said output carry voltage pulse in response to a first of two sequenced input actuation voltage pulses supplied to said carry-adder unit only when both of said storage units represent said predetermined one number, means for triggering said augend storage unit in response to said input carry voltage pulse only if said addend storage unit represents the other of said two numbers, means for triggering said augend storage unit in response to a second of said two input actuation voltage pulses supplied to said carry-adder unit only if said addend storage unit represents said predetermine one number, and means to prevent said last-mentioned means from triggering said augend storage unit when an input carry voltage pulse occurs at least as late in time as said first actuation voltage pulse and no later in time than said second actuation voltage pulse.

4. A parallel binary digital addition system comprising in combination a first plurality of triggered multivibrator storage units constituting an addend register; a second plurality of triggered multivibrator storage units constituting an augend register; each of said storage units having two stable states of conduction, two output terminals each capable of assuming two potentials each representative of one of two numbers, and a triggering input terminal; a plurality of carry-adder units each connected to sense potentials representing said numbers at the output terminals of a storage unit in a corresponding digit place of both said addend register and said augend register and connected to the triggering input terminal of said corresponding digit place augend register storage unit; each of said carry-adder units having a carry input terminal and a carry output terminal connected to the carry output terminal and the carry input terminal of the carry-adder unit in the preceding and succeeding digit place respectively; said carry-adder units having two input terminals for receiving a first and a second sequenced input actuation voltage pulse respectively; said carry-adder units comprising means responsive to said potentials sensed at the output terminals of said addend register and to any carry voltage input pulse received at said carry input terminal for enabling said first and second sequenced actuation voltage pulses to trigger the storage units constituting said augend register only when the number represented by the addend register differs from the number represented by the carry pulse input.

5. A binary digital addition system comprising in combination at least one addend storage unit, at least one augend storage unit, and at least one carry-adder unit; said storage units each having two output terminals complementally residing at two predetermined potentials during each of two stable conduction states, and a triggering input terminal; each of said conduction states representing one of two binary numbers; said carry-adder unit comprising a carry-voltage output terminal, a pulse amplifier for receiving and amplifying carry input voltage pulses, three transfer units connected to receive amplified voltage pulses from said amplifier, a first of said three transfer units connected to sense the potential at an output terminal of said addend storage unit and to transmit to said carry-voltage output terminal a received pulse only when said addend storage unit is in the conduction state representing a predetermined one of said two binary numbers, a second of said three transfer units connected to sense the potential at an output terminal of said addend storage unit and to transmit a received pulse to the triggering input terminal of said augend storage units only when said addend storage unit is in the conduction state representing the other of said two binary numbers, a third of said three transfer units connected to sense the potential at an output terminal of said augend storage unit and to transmit to said carry-voltage output terminal a received voltage pulse only when said augend storage unit is in the conduction state representing said predetermined number, a fourth transfer unit connected to receive a first of two sequenced input voltage pulses and to sense the potentials at an output terminal of each of said storage units and to transmit to said carry-voltage output terminal said first sequenced voltage pulse only if said storage units are both in the conduction state representing said predetermined number, a fifth transfer unit connected to receive a second of said sequenced pulses and to sense the potential at an output terminal of said addend storage unit and to transmit said second sequenced pulse to the triggering input terminal of said augend storage unit only if said addend storage unit is in the conduction state representing said predetermined number, and a time delay circuit connected in series with said fifth transfer unit and to the output of said amplifier to prevent said second sequenced pulse from being transmitted to said augend storage unit by said fifth transfer unit if an input carry pulse occurs at least as late in time as said first actuation voltage pulse and no later in time than said second actuation voltage pulse.

6. A carry-adder unit for use in digital computing apparatus having at least two storage units; said storage units representing by potential levels therein either of two binary numbers and being responsive to an electrical signal to be triggered from one of said number representations to the other; said carry-adder unit having a carry-voltage output terminal and comprising means for sensing said number-representative potential levels, means responsive to a first of two sequenced actuation voltage pulses supplied to said carry-adder unit for providing at said terminal a carry output voltage pulse from said carry-adder unit only when both of said storage units represent a predetermined one of said two numbers; means responsive to a second of said two sequenced actuation voltage pulses supplied to said carry-adder unit for providing a triggering electrical signal for one of said storage units only when the other of said storage units represents said predetermined one number, means responsive to a carry input voltage pulse supplied to said carry-adder unit for providing at said terminal a carry output voltage pulse from said carry-adder unit only when either of said storage units represents said predetermined one number and for providing a triggering electrical signal for said one of said storage units only when said other of said storage units represents the other of said two numbers, and means to prevent said third-mentioned means from providing said triggering signal when an input carry voltage pulse spaced in time between said two sequenced actuation voltage pulses is supplied to said carry-adder unit.

7. A carry-adder unit for use in digital computing apparatus having an addend storage unit and augend storage unit represented by potential levels therein either of two binary numbers in a corresponding digit place of an addend and an augend binary expression respectively, said carry-adder unit having a carry-voltage output terminal and comprising the combination of means for providing at said terminal an output carry voltage pulse in response to a first input voltage pulse only when both of said storage units represent a predetermined one of said two numbers, means for providing at said terminal an output carry voltage pulse in response to any input carry voltage pulse when either of said storage units represents said one number, means for providing an output triggering voltage pulse to said augend storage unit in response to said input carry voltage pulse only if said addend storage unit represents the other of said two numbers, means for providing an output triggering voltage pulse to said augend storage unit in response to a second input voltage pulse only if said addend storage unit represents said one number, and means to prevent said last-mentioned means from providing said triggering pulse for said augend storage unit when an input carry voltage pulse has preceded said second input voltage pulse in the same addition operation.

8. A carry-adder unit for use in digital computing apparatus having an addend storage unit and an augend storage unit representing by potential levels therein either of two binary numbers in a corresponding digit place of an addend and an augend binary expression respectively; said storage units each having two stable states of conduction, two oppositely designated output terminals, and an input triggering terminal; said carry-adder unit having a carry-voltage output terminal and comprising the combination of a first transfer unit for sensing the potential of one output terminal of each of said storage units and transmitting an output carry voltage pulse to said carry-voltage output terminal in response to a first of two sequenced input voltage pulses only if both of said storage units store a predetermined one of said two binary numbers, a second transfer unit for sensing the potential at an output terminal of said addend storage unit and transmitting an output carry voltage pulse to said carry-voltage output terminal in response to an input carry voltage pulse only if said addend storage unit stores said predetermined one number; a third transfer unit for sensing the potential of an output terminal of said augend storage unit and transmitting an output carry voltage pulse to said carry-voltage output terminal in response to an input carry voltage pulse only if said augend storage unit stores said predetermined one number; a fourth transfer unit for sensing the potential at an output terminal of said addend storage unit and transmitting a triggering voltage pulse to said augend storage unit in response to an input carry voltage pulse only if said addend storage unit stores the other of said two binary numbers; a fifth transfer unit for sensing the potential at an output terminal of said addend storage unit and transmitting a triggering voltage pulse to said augend storage unit in response to a second of said two sequenced input voltage pulses only if said addend storage unit stores said predetermined one number; and means connected to said fifth transfer unit to block said second sequenced voltage pulse and prevent said augend storage unit from being triggered in response to said second sequenced voltage pulse if an input carry voltage pulse precedes said second sequenced input voltage pulse in the same addition operation.

9. A carry-adder unit comprising a pulse amplifier having input terminals and output terminals; first, second, and third transfer units connected to receive output pulses from said amplifier and selectively transmit said pulses through said transfer units; a fourth and a fifth of said transfer units connected to receive a first and a second sequenced input voltage pulse respectively and to selectively transmit said sequenced voltage pulses therethrough; at least one information signal storage unit having output terminals representing two binary numbers; said transfer units comprising a capacitor, a rectifier and at least one sensing resistor connected to a common point and a source of reference potential connected to the terminal of said rectifier remote from said common point; means connecting the end of said at least one sensing resistor remote from said common point to one of said output terminals of said at least one storage unit; and time delay means connected in series with said fifth transfer unit and to said pulse amplifier output terminals, said time delay means having a time constant longer than the interval between application of said output pulse and said second sequenced input pulse in order to prevent said second sequenced input pulse from being transmitted by said fifth transfer unit when an output pulse from said amplifier has preceded said second sequenced input voltage pulse in the same single summing operation.

10. A parallel binary digital addition system, comprising in combination at least one addend and one augend storage unit each having two stable conduction states, and at least one carry-adder unit; said storage units each having two oppositely designated output terminals complementally residing at one of two predetermined potentials during each of said states and a triggering input terminal, said potentials each being representative of one of two binary numbers; said carry-adder unit being connected to sense the potentials of at least one output terminal of each of said storage units and to the triggering input terminal of said augend storage unit; a source of actuating pulses for said carry-adder unit, the pulses from said source being of relatively short duration compared to the interval between pulses; said carry-adder unit comprising means responsive to two sequence input voltage pulses from said source and an input carry voltage pulse the occurrence of which represents a carry input of a predetermined one of said two numbers and the absence of which represents a carry input of the other of said two numbers for triggering said augend storage unit only when the number represented by said addend storage unit and the carry input number supplied to said carry-adder unit are unlike.

11. A parallel binary digital addition system responsive to first and second actuating pulses and comprising addend and augend storage units each having output voltage terminals residing at one of two predetermined potentials, said potentials being representative of first and second binary numbers, said augend storage unit having an input triggering pulse terminal, and a plurality of carry-adder units each having input and output carry-pulse terminals and first and second actuating-pulse terminals, each of said carry-adder units further including means connected to said input and output carry pulse terminals and to said first actuating pulse terminal and responsive to the potentials at said augend and addend output terminals for enabling the passage of a pulse to said output carry pulse terminals only when the potential at at least two of said addend and augend output terminals and said carry pulse input terminals represent said first binary number, means connected to said second actuating pulse terminal and responsive to the addend storage unit output voltage for enabling the passage of said second actuating pulse to the input terminal of said augend storage unit to trigger the augend when the addend storage output potential indicates said first binary number, means connected between said carry pulse input terminals and said triggering input terminal of said augend storage unit and responsive to the addend output potential for enabling any input carry pulse to trigger the augend storage unit only when the addend potential represents said second binary number, and means connected to second actuating pulse terminal and responsive to the input carry potential to block the passage of the second actuating pulse to said triggering pulse input terminal of said augend storage unit after a carry voltage pulse input.

12. A binary digital adder responsive to first and second actuating pulses and comprising a plurality of storage units, one such unit for each digital position of an addend number and an augend number, each unit having output terminals and a triggering pulse input terminal, said output terminals complementally residing at one of two predetermined potentials representative of first and second binary numbers, a plurality of carry-adder units, and means connecting one such carry-adder unit between respective pairs of addend and augend storage units to sense the potentials at said output terminals, said carry-adder unit having first and second actuating pulse terminals and input and output carry pulse terminals and comprising means responsive to said sensed potentials and connected to said first actuating pulse terminals and said input carry pulse terminals for enabling the passage of a pulse to said output carry pulse terminal only when at least two of said addend and augend storage unit terminals and said carry pulse input terminals are representative of a first binary number, and means connected to said augend unit trigger input terminal and responsive to said sensed potentials and to any input carry pulse for enabling the passage of a triggering pulse to said triggering pulse input terminal only when said sensed potential at said addend output terminal represents a different number than is represented by the presence or absence of a pulse at said carry pulse input terminal.

13. A binary digital adder responsive to first and second actuating pulses and comprising a plurality of storage units, one such unit for each digital position of an addend number and an augend number, each unit having output terminals and a triggering pulse input terminal, said output terminals complementally residing at one of two predetermined potentials representative of first and second binary numbers, and a plurality of carry-adder units, means connecting one such carry-adder unit between respective pairs of addend and augend storage units to sense the output potentials at said output terminals, said carry-adder unit having first and second actuating pulse terminals and input and output carry pulse terminals and comprising means responsive to said sensed potentials and connected to said first actuating pulse terminals and said input carry pulse terminals for enabling the passage of a pulse to said output carry pulse terminal in accordance to the rules of binary addition, and means connected to said augend unit trigger input terminal and responsive to said sensed potentials and to any input carry pulse for enabling the passage of a triggering pulse to said triggering pulse input terminal in accordance with a predetermined relationship between the conditions of said addend output terminals and said carry pulse input terminal.

14. A parallel binary addition system responsive to first and second actuating pulses and comprising a plurality of addend and augend storage units, and a plurality of carry-adder units, said storage units having two oppositely designated output terminals complementally residing at one of two predetermined potentials representative of first and second binary numbers, said storage units each having a triggering-input terminal, said carry-adder unit having first and second actuating pulse terminals and input and output carry-voltage pulse terminals and comprising means connected to sense the potentials of said output terminals, means connected to said first actuating pulse terminals and to said input carry pulse terminals and responsive to said sensed potentials for enabling the passage of a pulse to said carry-output terminals in accordance with the requirements of binary addition, and means connected to said input-triggering-pulse terminal of said augend storage unit, to said second actuating-pulse terminal, and to said input-carry-pulse terminal for enabling the passage of a triggering pulse to said augend storage unit only when the potentials at said addend storage unit output terminals and said input carry pulse terminals are representative of different binary numbers.

15. A binary digital adder comprising a plurality of storage units, one such unit for each digital position of an addend number and an augend number, and a plurality of carry-adder units, and means connecting one such carry-adder unit between respective pairs of addend and augend storage units to sense the output potentials at said storage units, said carry-adder unit having input and output carry-pulse terminals and comprising means responsive to said sensed potentials and to any input carry pulse for transmitting an output carry pulse in accordance with a predetermined relation of said sensed potentials and said input carry pulse, and means responsive only to the sensed potential of said addend storage unit and any input carry pulse to trigger said augend storage unit only when the sensed addend storage unit potential and the input carry pulse are representative of different binary numbers.

References Cited in the file of this patent

UNITED STATES PATENTS

| | | |
|---|---|---|
| 2,404,250 | Rajchman | July 16, 1946 |
| 2,425,131 | Snyder | Aug. 5, 1947 |
| 2,489,302 | Levy | Nov. 29, 1949 |
| 2,503,765 | Rajchman | Apr. 11, 1950 |
| 2,568,932 | Rajchman | Sept. 25, 1951 |
| 2,580,771 | Harper | Jan. 1, 1952 |
| 2,636,133 | Hussey | Apr. 21, 1953 |
| 2,673,293 | Eckert | Mar. 23, 1954 |

(Other references on following page)

UNITED STATES PATENTS

| | | |
|---|---|---|
| 2,701,095 | Stibitz | Feb. 1, 1955 |
| 2,719,670 | Jacobs | Oct. 4, 1955 |
| 2,735,936 | Gridley | Feb. 21, 1956 |

OTHER REFERENCES

"A Functional Description of the EDVAC," volume I, pages 4–10 to 4–13; vol. II, sheet 104–31C–3. Nov. 1, 1949.

"High Speed Computing Devices," by ERA, pages 297 to 301. July 28, 1950.

Proc. of the IRE, "A Digital Computer for Scientific Applications," by West et al., pages 1452–1460. December 1948.

Electronics, "Gate-Type Shifting Register" by Knapton et al. (pages 186, 188, 190, 192). December 1949.

Electrical Engineering, "A Method of Gating Parallel Computers," by Ratz, page 424. May 1951.

Electronic Engineering, "The Physical Realization of an Electronic Digital Computer," by Booth, pages 492 to 498. December 1950.